US012612210B2

(12) United States Patent
Duez et al.

(10) Patent No.: US 12,612,210 B2
(45) Date of Patent: Apr. 28, 2026

(54) REINFORCEMENT FOR A MOTOR VEHICLE TANK

(71) Applicant: Plastic Omnium Advanced Innovation and Research, Brussels (BE)

(72) Inventors: Laurent Duez, Brussels (BE); Antoine Chaussinand, Brussels (BE); Damien Reveillard, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/688,946

(22) PCT Filed: Sep. 5, 2022

(86) PCT No.: PCT/EP2022/074587
§ 371 (c)(1),
(2) Date: Mar. 4, 2024

(87) PCT Pub. No.: WO2023/031454
PCT Pub. Date: Mar. 9, 2023

(65) Prior Publication Data
US 2025/0002202 A1 Jan. 2, 2025

(30) Foreign Application Priority Data
Sep. 6, 2021 (LU) ........................................ 500622

(51) Int. Cl.
*B60K 15/03* (2006.01)
*B65D 1/46* (2006.01)

(52) U.S. Cl.
CPC ................ *B65D 1/46* (2013.01); *B60K 15/03* (2013.01); *B60K 2015/03493* (2013.01)

(58) Field of Classification Search
CPC ........ B60K 2015/03467; B60K 15/073; B60K 2015/03453; B60K 2015/0346; B60K 2015/0344
See application file for complete search history.

(56) References Cited

U.S. PATENT DOCUMENTS

| | | | |
|---|---|---|---|
| 6,138,859 | A | 10/2000 | Aulph et al. |
| 2011/0226777 | A1 | 9/2011 | Asahara et al. |

(Continued)

FOREIGN PATENT DOCUMENTS

| | | |
|---|---|---|
| DE | 10 2012 019 334 A1 | 4/2014 |
| JP | 2007-237843 A | 9/2007 |

OTHER PUBLICATIONS

International Search Report issued Oct. 12, 2022 in PCT/EP2022/074587, filed on Sep. 5, 2022, 2 pages.

*Primary Examiner* — Stephen J Castellano
(74) *Attorney, Agent, or Firm* — Oblon, McClelland, Maier & Neustadt, L.L.P.

(57) ABSTRACT

A reinforcement for a plastic tank for a motor vehicle may include an attachment apparatus or element for attaching an internal reinforcing element of the tank. The attachment apparatus or element for attaching the internal reinforcing element may include at least a first structure configured to at least partially clamp around a first external part of the internal reinforcing element, and at least a second structure configured to surround at least partially a second external part of the internal reinforcing element. An assembly may be obtained after attaching an internal reinforcing element to such a reinforcement and a tank may include this assembly.

21 Claims, 3 Drawing Sheets

(56)              References Cited

U.S. PATENT DOCUMENTS

| 2015/0232226 | A1  | 8/2015 | Heidemeyer et al. | |
| 2016/0200192 | A1  | 7/2016 | Tsukahara et al. | |
| 2019/0092159 | A1* | 3/2019 | Amano | B60K 15/077 |
| 2021/0016655 | A1* | 1/2021 | Ryu | B60K 15/03006 |
| 2024/0123818 | A1* | 4/2024 | Nakaya | B60K 15/03177 |

* cited by examiner

REINFORCEMENT FOR A MOTOR VEHICLE TANK

CROSS-REFERENCE TO RELATED APPLICATIONS

The present application is the national stage of international application PCT/EP2022/074587, filed on Sep. 5, 2022, and claims the benefit of the filing date of Luxembourger Appl. No. 500622, filed on Sep. 6, 2021.

1. FIELD OF THE INVENTION

The invention relates to the technical field of plastic tanks for motor vehicles, more particularly liquid fuel tanks. The invention generally relates to a reinforcement for a plastic tank for a motor vehicle comprising at least one means for attaching an internal reinforcing element of the tank.

More particularly, the invention relates to a reinforcement for a plastic tank for a motor vehicle comprising at least one means for attaching an internal reinforcing element for a plastic tank for a motor vehicle.

The invention also relates to an assembly designed to be attached inside a plastic tank for a motor vehicle comprising said reinforcement and at least one internal reinforcing element, as well as to the plastic tank for a motor vehicle comprising said assembly. The invention also relates to a method for manufacturing a plastic tank for a motor vehicle.

2. SOLUTIONS OF THE PRIOR ART

Plastic fuel tanks obtained by extrusion blow-molding a parison undergo dimensional variations over their life, which can occur initially as soon as they exit the mold as a result of cooling thereof which is accompanied by shrinkage of the material, or during use thereof as a result in particular of positive or negative pressure of their contents, or as a result of thermal expansion thereof over their life, or as a result of aging thereof.

It is known practice to insert internal reinforcing elements within the tank during the manufacture thereof. The purpose of these internal reinforcing elements is to increase the ability of the plastic tank to withstand the mechanical stresses to which they are subjected over their life.

Thus, document US 2011/0226777 A1 discloses an assembly comprising a reinforcement and connection elements for connecting to the walls of the tank, said connection elements exhibiting low stiffness which prevents them from providing an internal reinforcing function, said reinforcement also comprising deformable structures in the longitudinal direction X of the vehicle, for which the reinforcement is intended, and in the transverse direction Y of this vehicle, but also in the vertical direction Z of said vehicle. However, such an assembly has a fairly limited ability to adapt to the dimensional variations of the tank. Furthermore, the resistance of such an assembly to compression and stretching in the vertical direction of the vehicle is too low. Document DE 10 2012 019334 A1 discloses an assembly similar to that of the document mentioned above, but which has the same problems with respect to adaptation and resistance.

3. OBJECTIVES OF THE INVENTION

The invention aims in particular to overcome these disadvantages of the prior art.

To this end, the invention aims to provide an assembly comprising a reinforcement for a plastic tank for a motor vehicle, the assembly also comprising at least one internal reinforcing element, said assembly having an increased ability to adapt to variations in the dimensions of the tank, more particularly during the manufacture of said tank, and exhibiting resistance to compression and stretching in the vertical direction Z with respect to the vehicle.

More specifically, one objective of the invention, in at least one of its embodiments, is to provide a reinforcement comprising an attachment means designed to attach at least one internal reinforcing element, the reinforcement and the at least one internal reinforcing element being able to form an assembly that has an increased ability to adapt to variations in the dimensions of a plastic tank for a motor vehicle, more particularly during the manufacture of said tank.

The invention, in at least one of its embodiments, further aims to provide a plastic tank for a motor vehicle.

Another aim of the invention, in at least one of its embodiments, is to implement a method for manufacturing a plastic tank for a motor vehicle.

4. SUMMARY OF THE INVENTION

In accordance with a particular embodiment, the invention relates to a reinforcement for a plastic tank for a motor vehicle comprising at least one means for attaching an internal reinforcing element of the tank.

According to the invention, the means for attaching the internal reinforcing element comprises:

- at least a first structure designed to at least partially clamp around a first external part of the internal reinforcing element and,
- at least a second structure designed to at least partially surround, preferentially clamp around, a second external part of the internal reinforcing element.

The general principle of the invention is based on the presence of a means for attaching the internal reinforcing element that simultaneously makes it possible to at least partially clamp around a first external part of the internal reinforcing element, to center the internal reinforcing element with respect to the reinforcement and to limit relative movements of the reinforcement and of the internal reinforcing element, mainly rotation of one with respect to the other, using at least a second structure designed to at least partially surround a second external part of the internal reinforcing element. However, such an attachment means also makes it possible to obtain a connection between the internal reinforcing element and the reinforcement exhibiting a certain degree of freedom of movement with respect to one another.

Thus, the invention is based on an entirely novel and inventive approach of an attachment means that makes it possible to increase the ability of an assembly comprising a reinforcement and at least one internal reinforcing element to adapt to variations in the dimensions of the tank and makes it possible to decrease the stresses brought about by the presence of said assembly within the tank. Furthermore, by at least partially clamping a first external part of the internal reinforcing element using a first structure in the axis parallel to the weld surface the internal reinforcing element on the tank makes it possible to increase the contact area between the reinforcement and the internal reinforcing element. This increase in area thus limits relative movements between the two parts in the two axes parallel to the weld surface in particular. Such an interconnection created between the internal reinforcing element and the reinforcement by the use of a second structure designed to at least partially surround a second external part makes it possible to ensure centering of the two parts. This centering limits the movements allowed just by at least partially clamping a first external part of the internal reinforcing element by means of the first structure. The reinforcement thus has an indirect connection with the tank, in a constant position. Preferentially, the second structure designed to at least partially surround a second external part of the internal reinforcing element is such that it clamps around said at least a second external part of the internal reinforcing element; this allows improved centering and attachment.

The expression "internal reinforcing element" refers to a structural element welded at both ends to the plastic tank with the aim of limiting the deformation of the tank during pressurization thereof.

The term "tank" is understood to mean a sealed tank able to store a liquid fuel under diverse and varied environmental conditions and conditions of use. The tank according to the invention is made with a plastic wall, generally comprising an internal face in its concave part and an external face in its convex part. Preferentially, the tank is a liquid fuel plastic tank.

The expression "a first structure designed to at least partially clamp around a first external part of the internal reinforcing element" is understood to mean that a part of the first structure comes into contact with at least a part of the first external part of the internal reinforcing element and exerts a pressure thereon.

The expression "a second structure designed to at least partially surround a second external part of the internal reinforcing element" is understood to mean that the second structure at least partially encircles a part of the second external part of the internal reinforcing element without necessarily exerting a pressure thereon. In other words, the second external part of the internal reinforcing element can be confined in a space wider than its dimensions and it is therefore capable of moving in a limited manner within the second structure.

The expression "a second structure designed to at least partially clamp around a second external part of the internal reinforcing element" is understood to mean that a part of the second structure comes into contact with at least a part of the second external part of the internal reinforcing element and exerts a pressure thereon.

Advantageously, the reinforcement for a plastic tank for a motor vehicle according to the invention is such that the first structure designed to at least partially clamp around a first external part of the internal reinforcing element comprises at least one arm designed to be inserted between two projections of the internal reinforcing element.

Thus, the insertion of at least one arm of the first structure of the attachment means between two projections present on a first external part of the internal reinforcing element makes it possible to prevent translational movements of the reinforcement with respect to the internal reinforcing element. More particularly, the insertion thereof makes it possible to block movements of the reinforcement with respect to the internal reinforcing element in the direction perpendicular to the weld surface of the internal reinforcing element on the plastic tank.

According to one preferred embodiment of the preceding embodiment, the reinforcement for a plastic tank for a motor vehicle according to the invention is such that the first structure designed to at least partially clamp around a first external part of the internal reinforcing element comprises at least two arms, preferentially the at least two arms, being designed to be inserted between two projections of the internal reinforcing element.

Thus, a first structure comprising two arms allows the stresses to be distributed over these two arms, thereby improving mechanical strength with respect to the stresses experienced.

According to one preferred embodiment of the preceding embodiment, the reinforcement for a plastic tank for a motor vehicle according to the invention is such that the first structure designed to at least partially clamp around a first external part of the internal reinforcing element comprises a part with a cavity in the material when the at least two arms are located in the same plane, said part with a cavity in the material being located between the two arms and facing the internal reinforcing element when the internal reinforcing element is attached to the reinforcement.

Thus, such a first structure having a part with a cavity in the material between the two arms allows the two arms to have greater flexibility, thereby allowing easier clamping of the internal reinforcing element.

According to one preferred embodiment, the reinforcement for a plastic tank for a motor vehicle according to the invention is such that the at least one arm forms a circular arc.

Thus, an arm in the shape of a circular arc makes it possible to obtain attachment in a clip-like manner, more particularly when the internal reinforcing element has a cylindrical region in which the clamping take place.

According to one preferred embodiment, the reinforcement for a plastic tank according to the invention is such that the first structure designed to clamp around at least a first external part of the internal reinforcing element comprises at least two arms, at least one of the two arms, preferentially both arms, being in the shape of a circular arc. Preferentially, at least one of the two arms has an angle greater than 180°. More preferentially, at least one arm is in the shape of a hook. When the first structure designed to clamp around at least a first external part of the internal reinforcing element comprises at least two arms in the shape of a circular arc, they have an angle of at most 180° when they are located in the same clamping plane, more particularly when the internal reinforcing element has a cylindrical region in which the clamping takes place, the angle of the circular arc being dependent on the material of which the arms. Such an arrangement makes clamping of the internal reinforcing element easier.

According to one preferred embodiment, the reinforcement for a plastic tank for a motor vehicle according to the invention is such that at least one arm comprises a protrusion at its end, said protrusion preferentially being oriented on the internal part of the arm that is intended to clamp around at least a first part of the internal reinforcing element.

Thus, the protrusion allows the length of the circular arc to be limited by ensuring the clamping of the internal reinforcing element. Limiting the length of the circular arc reduces "material" constraints during the positioning of the reinforcing element within the arm, preferentially between the two arms, of the first structure.

According to one preferred embodiment, the reinforcement for a motor vehicle tank according to the invention is such that the at least one arm comprises a locking means, for example in the form of a slope, designed to lock the attachment of the internal reinforcing element to the reinforcement.

Thus, the locking means makes it possible to secure the attachment of the internal reinforcing element to the reinforcement, which contributes to improving the reliability of this attachment.

According to one preferred embodiment, the reinforcement for a plastic tank for a motor vehicle according to the invention is such that the second structure designed to at least partially surround a second external part of the internal reinforcing element comprises at least one arm, preferentially at least two arms.

Thus, a second structure designed to at least partially surround a second external part of the internal reinforcing element comprising at least one arm, preferentially at least two arms, makes it possible to provide guidance during positioning of the internal reinforcing element on the reinforcement. Furthermore, such a second structure makes it possible to ensure retention of the internal reinforcing element in all directions, X, Y and Z, with respect to the vehicle. The at least one arm is, preferentially the at least two arms are, preferentially positioned on a second external part of the internal reinforcing element, which part is located at the opposite end of the internal reinforcing element on which it must be placed with respect to the first external part of the internal reinforcing element, which part is clamped by the first structure. This advantageously makes it possible to prevent the possibility of the internal reinforcing element rotating around the rod.

According to one preferred embodiment of the preceding embodiment, the reinforcement for a plastic tank for a motor vehicle according to the invention is such that the at least one of the two arms, preferentially both of the at least two arms, forms a circular arc. Preferentially, at least one of the two arms has an angle greater than 180°. More preferentially, at least one arm is in the shape of a hook. When the second structure designed to at least partially surround a second external part of the internal reinforcing element comprises at least two arms in the shape of a circular arc, they have an angle of at most 180° when they are located in the same clamping plane, more particularly when the internal reinforcing element has a cylindrical region in which the partial encircling takes place, the angle of the circular arc being dependent on the material of which the arms. Such an arrangement makes surrounding of the internal reinforcing element easier.

Thus, such an arrangement makes it possible to combine a guide function with a mechanical support function between the second structure and the internal reinforcing element.

According to one preferred embodiment of the preceding embodiment, the reinforcement for a motor vehicle tank according to the invention is such that the at least one arm of the second structure designed to at least partially surround a second external part of the internal reinforcing element is attached to an extension, preferentially in the shape of a rod.

Thus, the use of such an extension makes it possible to reduce bulk and the amount of material used.

The reinforcement for a motor vehicle tank according to the invention is such that the first structure designed to clamp around a first external part of the internal reinforcing element has an internal circumference that is larger than the internal circumference of the second structure designed to at least partially surround a second external part of the internal reinforcing element.

Thus, a first structure designed to clamp around a first external part of the internal reinforcing element that has an internal circumference larger than the internal circumference of the second structure designed to at least partially surround a second external part of the internal reinforcing element allows the attachment of a reinforcing element that has at least one region of smaller cross section which is intended to break in the event of an excessive mechanical load, the attachment of the second structure being preferentially located in this region.

According to one preferred embodiment, the reinforcement for a plastic tank for a motor vehicle according to the invention is such that it comprises a deformable connection connecting the reinforcement and the means for attaching the internal reinforcing element, said connection being designed to deform in order to allow a relative movement of the reinforcement and of the means for attaching the internal reinforcing element with respect to one another when subjected to a mechanical load external to the reinforcement.

Thus, a deformable connection makes it possible to reduce the stresses on the reinforcement, said stresses being related to variations in temperature and pressure in the tank which give rise to deformations via movement of the internal reinforcing element or internal reinforcing elements with respect to one another. These movements give rise to stresses on the reinforcement if no deformable connection is present on the reinforcement and therefore between it and the one or more internal reinforcing elements. Preferentially, the deformable connection allows deformations in the axes parallel to the weld surface of the internal reinforcing element on the tank.

According to one preferred embodiment, the reinforcement for a plastic tank for a motor vehicle according to the invention is based on a material selected from the group of materials consisting of high-density polyethylene (HDPE), polyoxymethylene (POM), polyamide (PA), polyphthalamide (PPA) and polyketone (PK). Preferentially, the reinforcement takes the form of a one-piece part.

The reinforcement can also comprise support means for components of the fuel tank such as a pump, a level sensor, a pressure sensor, a temperature sensor and a valve such as a rollover valve (ROV) or a fill limit vent valve (FLVV), or for allowing the attachment of vent and fuel lines. The reinforcement can also comprise or act as a support for a deflector, also called noise-reducing baffles or slosh baffles. Preferentially, the components of the fuel tank, the vent and fuel lines and/or the deflector are/is attached to the reinforcement by clipping. Thus, clipping allows easy handling and attachment of the components of the fuel tank, vent and fuel lines and/or the deflector to the reinforcement.

According to one preferred variant, the reinforcement for a plastic tank for a motor vehicle is such that the reinforcement comprises a plurality of through-holes. Preferentially, the reinforcement is also provided with stiffening means such as ribs.

Thus, the presence of through-holes in the reinforcement allows for easier movement of the liquid contained in the tank. The presence of stiffening means on the reinforcement allows it to better withstand stresses related to the attachment of a component to the reinforcement or stresses generated by a fuel tank comprising it.

According to one preferred variant, the reinforcement for a plastic tank for a motor vehicle is such that it comprises a receiving member designed to receive an insertion means, such as an insertion rod for example, used during the manufacture of the tank in order to insert an assembly comprising the reinforcement into a parison. Said receiving member is advantageously provided in the form of a hole or a blind hole.

Another aim of the invention is to provide an assembly for a plastic tank for a motor vehicle comprising a reinforcement for a plastic tank for a motor vehicle according to the invention and an internal reinforcing element. Preferentially, the internal reinforcing element comprises at least a first part that is intended to be clamped by the first structure of the attachment means of the reinforcement and at least a second part that is designed to be at least partly surrounded by a second structure of the attachment means of the reinforcement and such that the first part of the internal reinforcing element comprises at least two projections for inserting an arm of the first structure of the attachment means of the reinforcement. The insertion of at least one arm of the first structure of the attachment means between two projections present on the internal reinforcing element makes it possible to prevent translational movements of the reinforcement with respect to the internal reinforcing element. More particularly, the insertion thereof makes it possible to block movements of the reinforcement with respect to the internal reinforcing element in the direction perpendicular to the weld surface of the internal reinforcing element on the tank. The projections are not located at regions of high stress and therefore do not weaken the internal reinforcing element.

Preferentially, the internal reinforcing element takes the form of a pillar in the shape of a column, which is preferentially cylindrical, or in the shape of a diabolo. The internal reinforcing element can also be in the form of a retaining member comprising a wall provided with a central recess, a part of the wall comprising reinforcing ribs. The wall of the retaining member can be planar or curved. Said reinforcing element preferentially comprises, at its two ends, two parts overmolded in a material suitable for being welded to the walls of the tank. The internal reinforcing element preferentially consists of a central part based on polyoxymethylene (POM), polyphthalamide (PPA), polyketone (PK), polyamide (PA), metal and two overmolded parts made of high-density polyethylene (HDPE). The internal reinforcing element preferentially comprises a region of mechanical weakness capable of causing said element to break when the element is subjected to high stresses resulting from the forces exerted on the tank. This region of mechanical weakness takes the form of a smaller cross section, of at least one notch or of a reduced thickness of the wall. The internal reinforcing element can comprise a hollow part, more particularly in the central part of the reinforcing element. This region of weakness preferentially corresponds to the second external part of the internal reinforcing element.

Another aim of the invention is to provide a plastic tank for a motor vehicle comprising an assembly for a plastic tank for a motor vehicle according to the invention.

Another aim of the invention is to provide a method for manufacturing a plastic tank for a motor vehicle.

According to one advantageous implementation of the method for manufacturing a plastic tank for a motor vehicle according to the invention, said method comprises a step of attaching an internal reinforcing element according to the invention to a reinforcement for a plastic tank for a motor vehicle according to the invention.

5. LIST OF FIGURES

Other features and advantages of the invention will become more clearly apparent on reading the following description of a preferred embodiment, given by way of simple, illustrative and non-limiting example, and from the appended drawings, among which:

6. DESCRIPTION OF AT LEAST ONE EMBODIMENT OF THE INVENTION

Figure 1:
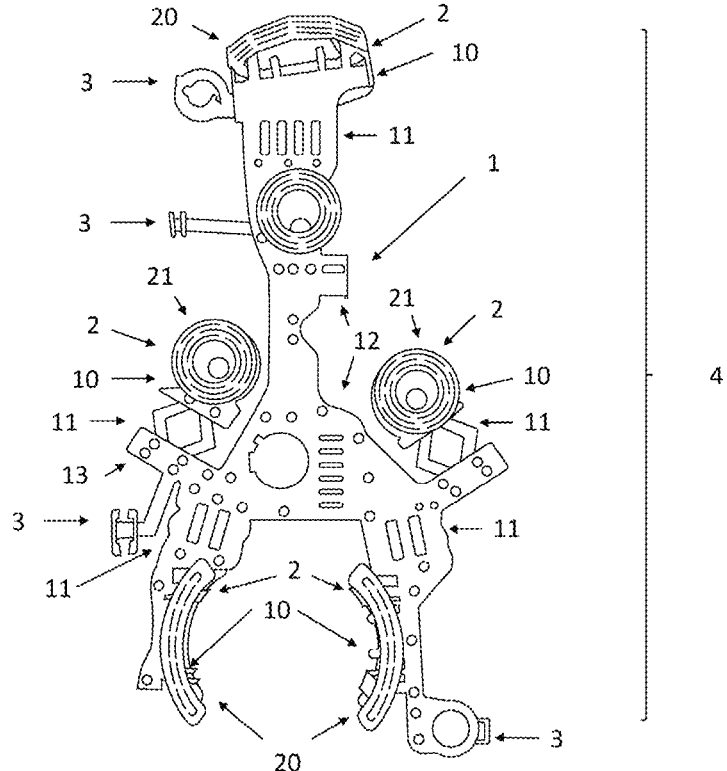
FIG. 1 shows an assembly for a plastic tank for a motor vehicle according to the invention.

With reference to FIG. 1, one embodiment of an assembly 4 for a plastic tank for a motor vehicle according to the invention, comprising a reinforcement 1 and internal reinforcing elements 2, is shown. The reinforcement 1 for a plastic tank for a motor vehicle comprises at least one means 10 for attaching an internal reinforcing element 2 to the tank. The reinforcement 1 comprises a deformable connection 11 connecting the reinforcement 1 and the means 10 for attaching the internal reinforcing element 2, said connection 10 being capable of deforming in order to allow a relative movement of the reinforcement 1 and of the means 10 for attaching the internal reinforcing element 2 with respect to one another when subjected to a mechanical load external to the reinforcement 1. The reinforcement 1 also comprises a receiving member 12 designed to receive an insertion means, such as an insertion rod for example, for inserting the assembly 4 into a parison during the manufacture of the tank. Said receiving member 12 is advantageously provided in the form of a hole or a blind hole. The reinforcement 1 is based on a material selected from the group of materials consisting of high-density polyethylene (HDPE), polyoxymethylene (POM), polyamide (PA), polyphthalamide (PPA) and polyketone (PK). The reinforcement 1 also comprises support means 3 for components of the fuel tank such as a pump, a level sensor, a pressure sensor, a temperature sensor and a valve such as a rollover valve (ROV) or a fill limit vent valve (FLVV), or for allowing the attachment of vent and fuel lines. The reinforcement 1 also comprises a plurality of through-holes 13. Preferentially, the reinforcement 1 is also provided with stiffening means such as ribs not shown. Preferentially, the internal reinforcing elements 2 take the form of a pillar 21 in the shape of a column, which is preferentially cylindrical, or in the shape of a diabolo. The internal reinforcing elements 2 can also be in the form of a retaining member 20 comprising a wall provided with a central recess, a part of the wall comprising reinforcing ribs. The wall of the retaining member can be planar or curved. Said reinforcing elements 2 preferentially comprise, at their two ends, two parts overmolded in a material suitable for being welded to the walls of the tank. The internal reinforcing elements 2 preferentially consist of a central part based on polyoxymethylene (POM), polyphthalamide (PPA), polyketone (PK), polyamide (PA), metal and two overmolded parts made of high-density polyethylene (HDPE). The internal reinforcing elements preferentially comprise a region of mechanical weakness capable of causing said elements to break when the elements are subjected to high stresses resulting from the forces exerted on the tank.

Figure 2:
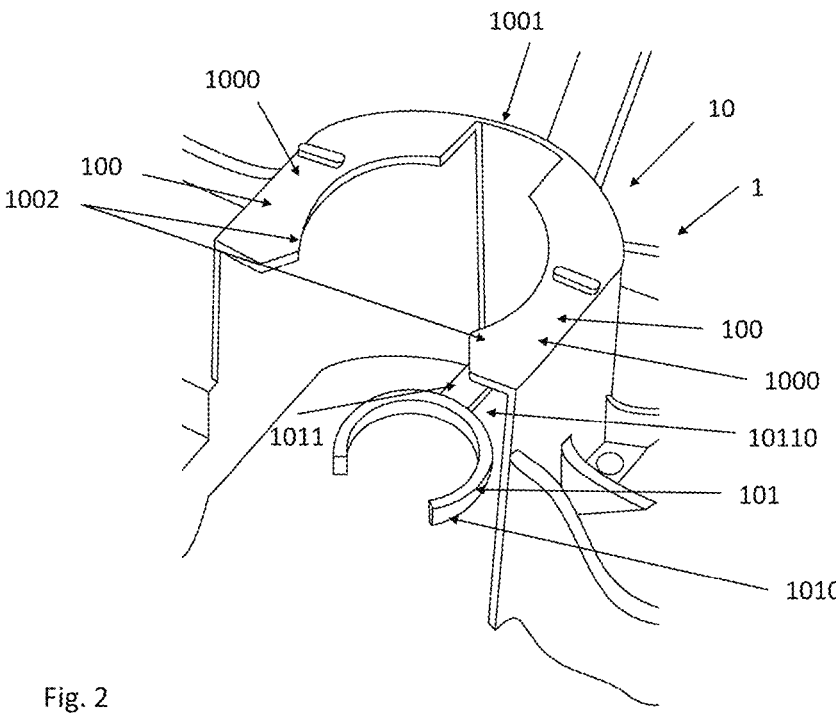
FIG. 2 illustrates a means for attaching an internal reinforcing element of a reinforcement according to the invention.

FIG. 2 shows a means 10 for attaching an internal reinforcing element of the tank to a reinforcement 1. Said means 10 comprises at least a first structure 100 designed to at least partially clamp around a first external part of the internal reinforcing element and at least a second structure 101 designed to at least partially surround a second external part of the internal reinforcing element. The first structure 100 designed to at least partially clamp around a first external part of the internal reinforcing element comprises two arms 1000 that are designed to be inserted between two projections of the internal reinforcing element, the two arms 1000 taking the shape of a circular arc and each comprising a protrusion 1002 at their end, said protrusion 1002 being oriented on the internal part of the arms 1000. The two arms 1000 in the shape of a circular arc have an angle of at most 180° when they are located in the same clamping plane. The second structure 101 designed to at least partially surround a second external part of the internal reinforcing element comprises at least one arm 1010 in the shape of a circular arc attached to an extension 1011 in the shape of a rod 10110. The arm 1010 in the shape of a circular arc has an angle greater than 180°. It is noted that the first structure 100 designed to clamp around a first external part of the internal reinforcing element has an internal circumference that is larger than the internal circumference of the second structure 101 designed to at least partially surround a second external part of the internal reinforcing element.

Figure 3:
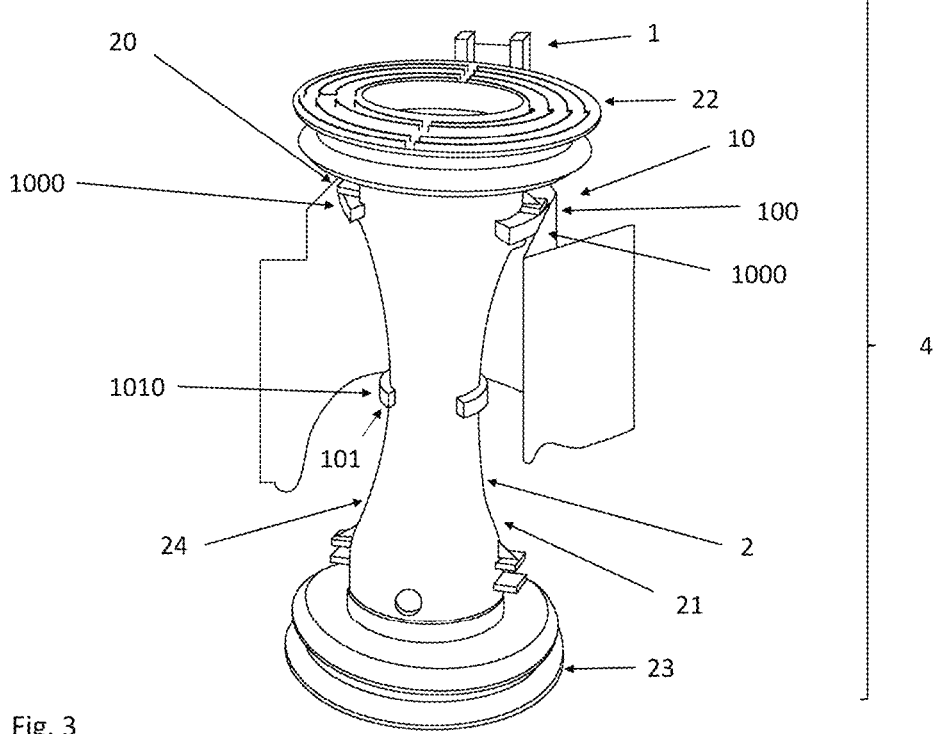
FIG. 3 illustrates the connection between an internal reinforcing element and a reinforcement according to the invention.

FIG. 3 shows the connection between an internal reinforcing element 2 and a reinforcement 1 according to the invention forming part of the assembly 4 for a plastic tank for a motor vehicle. The connection is made using a means 10 comprising at least a first structure 100 designed to at least partially clamp around a first external part of the internal reinforcing element and at least a second structure 101 designed to at least partially surround a second external part of the internal reinforcing element 2. The first structure 100 designed to at least partially clamp around a first external part of the internal reinforcing element comprises two arms 1000 that are designed to be inserted between two projections 20 of the internal reinforcing element 2, the two arms 1000 taking the shape of a circular arc and each comprising a protrusion at their end, said protrusion being oriented on the internal part of the arms 1000. The two arms 1000 in the shape of a circular arc have an angle of at most 180°. The second structure 101 designed to at least partially surround a second external part of the internal reinforcing element 2 comprises at least one arm 1010 in the shape of a circular arc attached to an extension in the shape of a rod. The arm 1010 in the shape of a circular arc has an angle greater than 180°. It is noted that the first structure 100 designed to clamp around a first external part of the internal reinforcing element 2 has an internal circumference that is larger than the internal circumference of the second structure 101 designed to at least partially surround a second external part of the internal reinforcing element 2. The internal reinforcing element 2 takes the shape of a diabolo 21 comprising, at its two ends, two parts overmolded in a material suitable for being welded to the walls of the tank. The internal reinforcing element 2 preferentially consists of a central part 24 based on polyoxymethylene (POM), polyphthalamide (PPA), polyketone (PK), polyamide (PA), metal and two overmolded parts made of high-density polyethylene (HDPE) 22, 23. The internal reinforcing element 2 preferentially comprises a region of mechanical weakness capable of causing said elements to break when the elements are subjected to high stresses resulting from the forces exerted on the tank. This region of weakness preferentially corresponds to the second external part of the internal reinforcing element 2.

Figure 4:
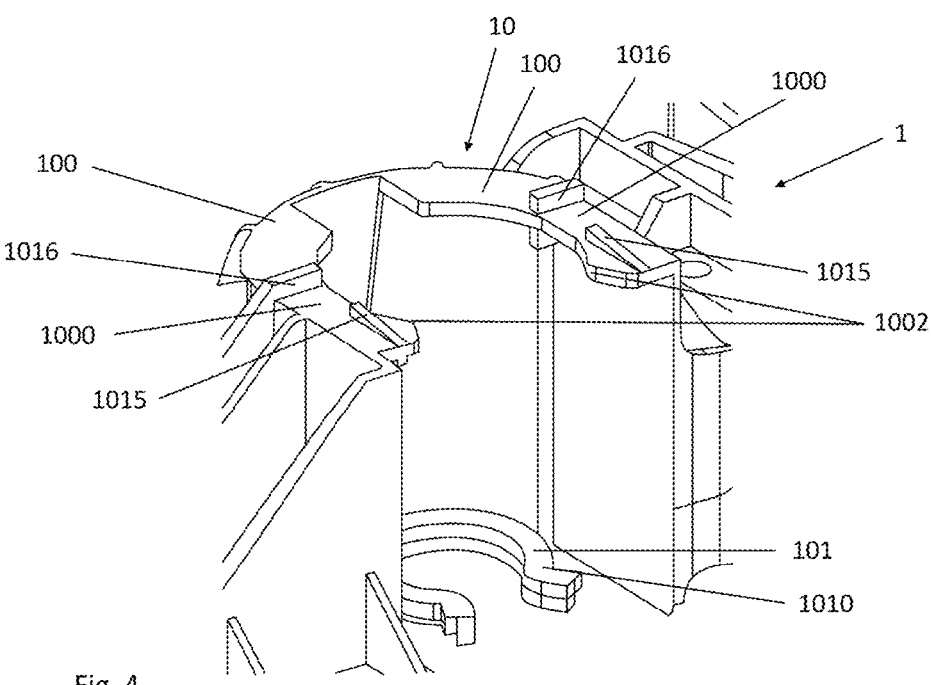
FIG. 4 illustrates a means for attaching an internal reinforcing element of the tank to a reinforcement according to one alternative embodiment of the invention.

FIG. 4 shows a means 10 for attaching an internal reinforcing element of the tank to a reinforcement 1 according to one alternative embodiment of the invention. Said means 10 comprises at least a first structure 100 designed to at least partially clamp around a first external part of the internal reinforcing element and at least a second structure 101 designed to at least partially surround a second external part of the internal reinforcing element. The first structure 100 designed to at least partially clamp around a first external part of the internal reinforcing element comprises two arms 1000 that are designed to be inserted between two projections of the internal reinforcing element, the two arms 1000 taking the shape of a circular arc and each comprising a protrusion 1002 at their end, said protrusion 1002 being oriented on the internal part of the arms 1000. The two arms 1000 in the shape of a circular arc have an angle of at most 180° when they are located in the same clamping plane. The second structure 101 designed to at least partially surround a second external part of the internal reinforcing element comprises at least one arm 1010 in the shape of a circular arc attached to an extension 1011 in the shape of a rod 10110. The arm 1010 in the shape of a circular arc has an angle greater than 180°. The first structure 100 designed to clamp around a first external part of the internal reinforcing element has an internal circumference that is larger than the internal circumference of the second structure 101 designed to at least partially surround a second external part of the internal reinforcing element.

Each of the arms 1000 has a free end, located next to the corresponding protrusion 1002, and a base end, the base ends of the two arms being oriented toward one another and being separated from one another by a cavity in the material 1001. Each of the two arms 1000 has, on its upper surface, a locking means 1015 designed to lock the attachment of the internal reinforcing element to the reinforcement 1. On each arm, the locking means 1015 takes the form of a straight slope extending over part of the length of the arm, for example less than 50% of the length of the arm, in this case approximately 25% of the length of the arm in the embodiment of FIG. 4. The slope has a low point flush with the upper surface of the arm and flush with the free end part of the arm, and a top located at a distance from the end part of the arm. Each of the two arms 1000 further comprises a stop 1016 located facing the top of the slope forming the locking means 1015, and at a distance therefrom.

Figure 5:
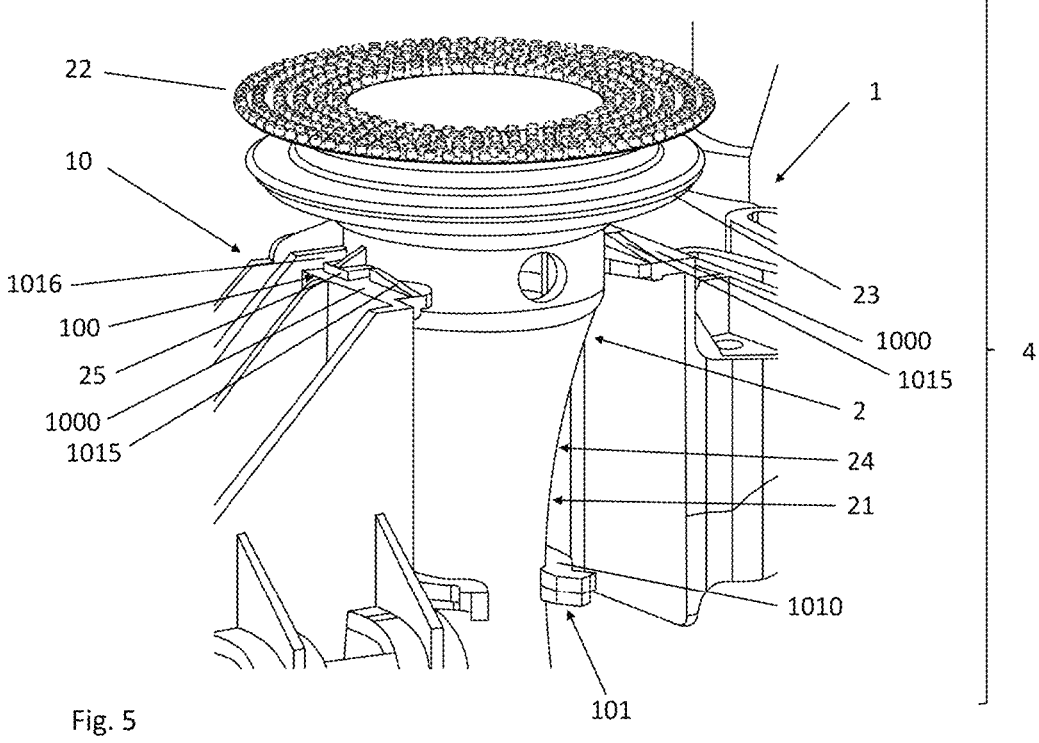
FIG. 5 illustrates a connection between an internal reinforcing element and a reinforcement according to one alternative embodiment of the invention forming part of the assembly for a plastic tank for a motor vehicle.

FIG. 5 shows the connection between an internal reinforcing element 2 and a reinforcement 1 according to one alternative embodiment of the invention forming part of the assembly 4 for a plastic tank for a motor vehicle, implementing the means 10 for attaching an internal reinforcing element of the tank to a reinforcement 1 of FIG. 4. The connection is made using a means 10 comprising at least a first structure 100 designed to at least partially clamp around a first external part of the internal reinforcing element and at least a second structure 101 designed to at least partially surround a second external part of the internal reinforcing element 2. The first structure 100 designed to at least partially clamp around a first external part of the internal reinforcing element comprises two arms 1000 that are designed to be inserted between two projections 20 of the internal reinforcing element 2, the two arms 1000 taking the shape of a circular arc and each comprising a protrusion at their end, said protrusion being oriented on the internal part of the arms 1000. The two arms 1000 in the shape of a circular arc have an angle of at most 180°. The second structure 101 designed to at least partially surround a second external part of the internal reinforcing element 2 comprises at least one arm 1010 in the shape of a circular arc attached to an extension in the shape of a rod. The arm 1010 in the shape of a circular arc has an angle greater than 180°. The first structure 100 designed to clamp around a first external part of the internal reinforcing element 2 has an internal circumference that is larger than the internal circumference of the second structure 101 designed to at least partially surround a second external part of the internal reinforcing element 2. The internal reinforcing element 2 takes the shape of a diabolo 21 comprising, at its two ends, two parts overmolded in a material suitable for being welded to the walls of the tank. The internal reinforcing element 2 preferentially consists of a central part 24 based on polyoxymethylene (POM), polyphthalamide (PPA), polyketone (PK), polyamide (PA), metal and two overmolded parts made of high-density polyethylene (HDPE) 22, 23. The internal reinforcing element 2 preferentially comprises a region of mechanical weakness capable of causing said elements to break when the elements are subjected to high stresses resulting from the forces exerted on the tank. This region of weakness preferentially corresponds to the second external part of the internal reinforcing element 2.

The internal reinforcing element 2 comprises two fins 25, each comprising a bracket and a plate extending radially with respect to the internal reinforcing element, which are rigidly connected to the internal reinforcing element. During the insertion of the internal reinforcing element 2 into the means 10, the fins 25 slide over the slopes forming the locking means 1015 provided on the two arms 1000 until reaching the top of the slope. The fins 25 then fall into the space located between the locking means 1015 and the stops 1016. The shape of the slope locks the internal reinforcing element 2 in position attached in the means 10, which makes it possible to ensure robust attachment of the internal reinforcing element to the reinforcement.

The invention claimed is:

1. A reinforcement suitable for a plastic tank configured for a motor vehicle, the reinforcement comprising:

an attachment apparatus configured for attaching to an internal reinforcing element of the plastic tank, the internal reinforcing element comprising a first end and a second end, both ends arranged to be welded directly on the plastic tank, the attachment apparatus comprising:

a first structure configured to at least partially clamp, in an inward direction orthogonal to a weld surface of the internal reinforcing element on the plastic tank, around a first external part of the internal reinforcing element, and a second structure configured to at least partially surround a second external part of the internal reinforcing element, wherein the first structure is closer to the first end of the internal reinforcing element than the second structure and the second structure is closer to the second end of the internal reinforcing element than the first structure, and wherein the first structure has a first internal circumference that is larger than a second internal circumference of the second structure.

2. A reinforcement suitable for a plastic tank configured for a motor vehicle, the reinforcement comprising:

an attachment apparatus configured for attaching to an internal reinforcing element of the plastic tank, the internal reinforcing element being configured to be welded directly at both ends to the plastic tank and having a longitudinal axis and radial axes perpendicular to the longitudinal axis, the attachment apparatus having a height that is parallel to the longitudinal axis and a width that is in a plane parallel to the radial axes, the attachment apparatus comprising:

a first structure configured to at least partially clamp around a first external part of the internal reinforcing element, and a second structure configured to at least partially surround a second external part of the internal reinforcing element, wherein the first structure has a first internal circumference that is larger than a second internal circumference of the second structure, wherein the first structure is spaced from the second structure along the longitudinal axis, and wherein (i) the first structure at least partially encircles part of the first external part of the internal reinforcing element so as to be configured to exert a pressure radially inwardly, in a plane parallel to the radial axes, on the part of the first external part, and/or (ii) the second structure at least partially encircles part of the second external part of the internal reinforcing element so as to be configured to exert a pressure radially inwardly, in a plane parallel to the radial axes, on the part of the second external part.

3. The reinforcement of claim 2, wherein the first structure comprises a first arm configured to be inserted between two projections of the internal reinforcing element.

4. The reinforcement of claim 3, wherein the first structure further comprises a second arm.

5. The reinforcement of claim 4, wherein the first structure comprises a cavity, and wherein the cavity is located between a base end of the first and second arm when the first and second arm are located in a common plane, the cavity faces the internal reinforcing element when the internal reinforcing element is attached to the reinforcement.

6. The reinforcement of claim 4, wherein the second arm is configured to be inserted between two projections of the internal reinforcing element.

7. The reinforcement of claim 3, wherein the first arm forms a circular arc.

8. The reinforcement of claim 3, wherein the first arm comprises a protrusion at an end of the first arm.

9. The reinforcement of claim 8, wherein the protrusion is oriented on the internal part of the first arm configured to clamp around at least a first part of the internal reinforcing element.

10. The reinforcement of claim 3, wherein the first arm comprises a lock.

11. The reinforcement of claim 10, wherein the third arm forms a circular arc.

12. The reinforcement of claim 10, wherein the third arm is attached to an extension.

13. The reinforcement of claim 10, wherein the lock is formed as a slope configured to lock the attachment of the internal reinforcing element to the reinforcement.

14. The reinforcement of claim 2, wherein the second structure comprises a third arm.

15. The reinforcement of claim 14, wherein the second structure further comprises a fourth arm.

16. The reinforcement of claim 14, wherein the third arm is attached to an extension having a rod shape.

17. The reinforcement of claim 1, further comprising:

a deformable connection connecting a central region of the reinforcement and the attachment apparatus, wherein the connection is configured to deform in order to allow a relative movement of the central region of the reinforcement and the attachment apparatus with respect to one another when subjected to a mechanical load external to the reinforcement.

18. An assembly suitable for a plastic tank configured for a motor vehicle, the assembly comprising:

the reinforcement of claim 1; and an internal reinforcing element configured to be welded directly at both ends to the plastic tank.

19. The assembly of claim 18, wherein the internal reinforcing element comprises a first part configured to be clamped by the first structure of the attachment apparatus of the reinforcement, and a second part configured to be at least partly surrounded by the second structure, wherein the first part of the internal reinforcing element comprises a first projection and a second projection configured for receiving an arm of the first structure of the attachment apparatus therebetween.

20. A plastic tank configured for a motor vehicle, the plastic tank comprising:

the assembly of claim 3.

21. A method for manufacturing a plastic tank for a motor vehicle, the method comprising:

attaching an internal reinforcing element to the reinforcement of claim 1.

* * * * *